United States Patent
Reed et al.

(10) Patent No.: US 8,424,415 B2
(45) Date of Patent: Apr. 23, 2013

(54) NON-ROTATING CLUTCH AND METHOD OF INSTALLING SAME

(75) Inventors: William S. Reed, Greenfield, IN (US); Greg B. Witczak, Indianapolis, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 730 days.

(21) Appl. No.: 12/574,844

(22) Filed: Oct. 7, 2009

(65) Prior Publication Data

US 2011/0079485 A1 Apr. 7, 2011

(51) Int. Cl.
*F16H 57/02* (2012.01)
*F16H 57/04* (2010.01)
*F16H 61/00* (2006.01)

(52) U.S. Cl.
USPC .......................................... 74/606 R; 310/78

(58) Field of Classification Search ............... 74/606 R; 310/78, 92, 75 R; 29/893.1, 893.2, 521; H02K 7/10, H02K 7/11, 7/108
See application file for complete search history.

(56) References Cited

U.S. PATENT DOCUMENTS

| | | | | |
|---|---|---|---|---|
| 4,709,794 A * | 12/1987 | Lengsfeld et al. | ......... | 192/18 B |
| 4,877,987 A * | 10/1989 | Flaig et al. | .................... | 310/209 |
| 6,508,094 B1 * | 1/2003 | Gotou et al. | ...................... | 72/85 |
| 7,383,933 B2 * | 6/2008 | Reed et al. | ................. | 192/219.5 |
| 7,556,131 B2 * | 7/2009 | Seipold | ........................ | 192/48.8 |
| 7,946,366 B2 * | 5/2011 | Kano et al. | ................... | 180/65.6 |
| 8,234,954 B2 * | 8/2012 | Holmes et al. | ............. | 74/606 R |
| 2005/0206248 A1 * | 9/2005 | Raszkowski et al. | ........... | 310/54 |
| 2009/0318257 A1 * | 12/2009 | Hawkins | ...................... | 475/331 |

* cited by examiner

*Primary Examiner* — Justin Holmes
(74) *Attorney, Agent, or Firm* — Quinn Law Group, PLLC

(57) ABSTRACT

A hybrid transmission includes a transmission housing and a motor/generator stator configured to be attached to the transmission housing. A clutch housing is configured to be attached to the motor/generator stator, such that the clutch housing is not directly attached to the transmission housing but is statically fixed. An axis of rotation defines a coordinate system having axial, radial, and clocking rotations. A first piloting feature may be formed on the clutch housing and a second piloting feature on the transmission housing. The first and second piloting features cooperate to axially and radially orient, but not attach, the clutch housing relative to the transmission housing. Third and fourth piloting features cooperate to orient the clocking rotation of the clutch housing. Stator bolts may permanently locate and attach the motor/generator stator to the transmission housing, and clutch bolts permanently locate and attach the clutch housing to the motor/generator stator.

12 Claims, 4 Drawing Sheets

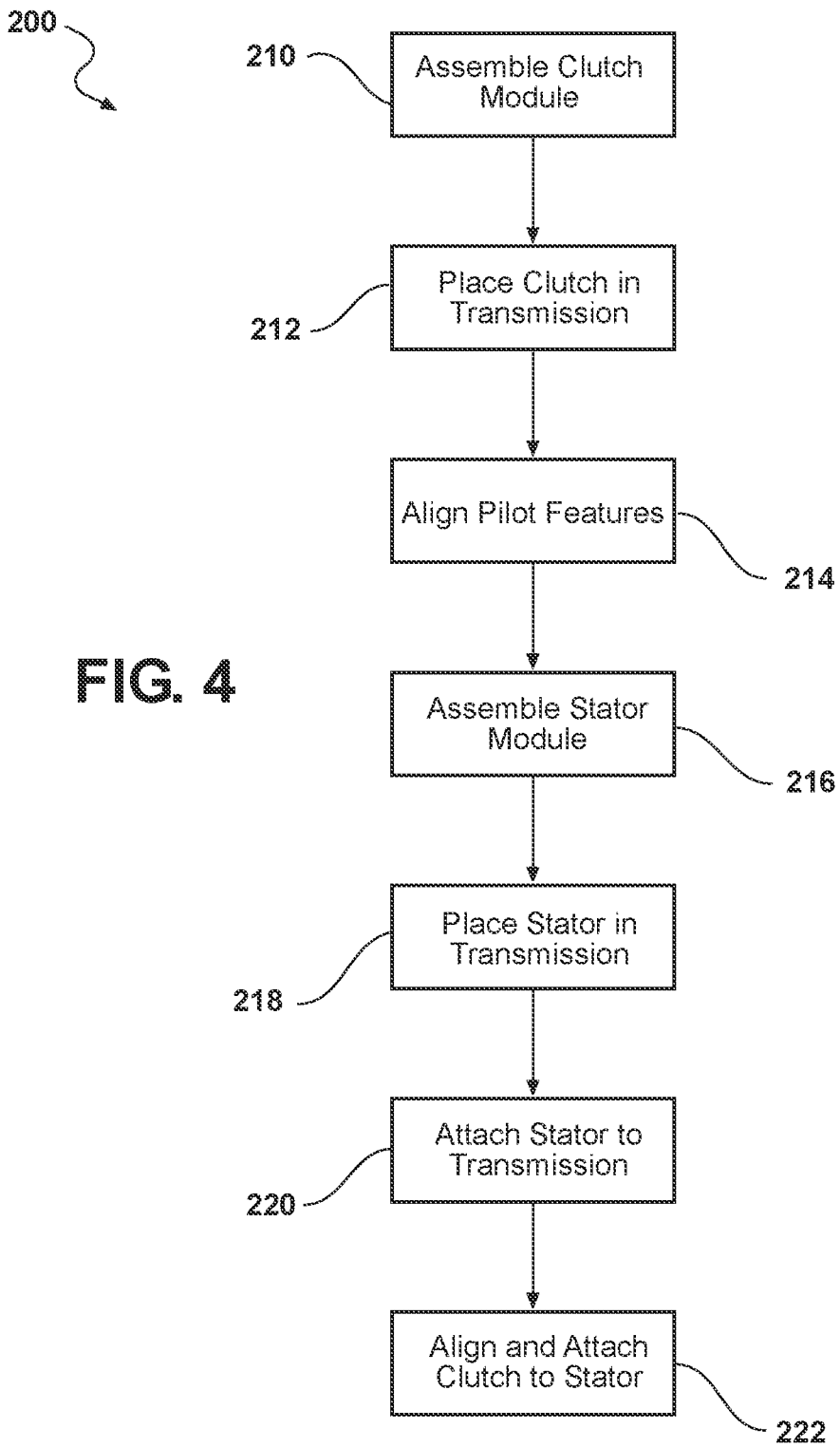

NON-ROTATING CLUTCH AND METHOD OF INSTALLING SAME

TECHNICAL FIELD

This disclosure relates to torque transmitting mechanisms for transmissions.

BACKGROUND OF THE INVENTION

Clutches are mechanisms for transmitting rotation, which can be engaged and disengaged. Friction clutches may have two sets of interleaved plates which are pressed into frictional engagement when actuated, causing common rotation (or lack of rotation, depending upon the viewpoint) between the sets of plates and members attached thereto. Generally, engagement allows torque to be transferred across the clutch, and disengagement does not allow torque transfer.

SUMMARY

A hybrid transmission is provided, and includes a transmission housing and a motor/generator stator which is configured to be attached to the transmission housing. A clutch housing is configured to be attached to the motor/generator stator, such that the clutch housing is not directly attached to the transmission housing but is statically fixed.

An axis of rotation of the transmission may define a coordinate system. The coordinate system has an axial direction, a radial direction, and a clocking rotation. There may be a first piloting feature formed on the clutch housing. A second piloting feature may be formed on the transmission housing, such that the second piloting feature and the first piloting feature cooperate to orient the clutch housing relative to the transmission housing in the axial direction and the radial direction. However, the second piloting feature and the first piloting feature are configured not to permanently locate the clutch housing in the axial direction and not to permanently attach the clutch housing to the transmission housing.

The transmission may include a third piloting feature formed on the transmission housing and a fourth piloting feature formed on the clutch housing. Therefore, the third piloting feature and the fourth piloting feature may cooperate to orient the clocking rotation of the clutch housing relative to the transmission housing.

The transmission may further include a plurality of stator bolts configured to permanently locate the axial direction, the radial direction and clocking rotation of the motor/generator stator relative to the transmission housing, and also to permanently attach the motor/generator stator to the transmission housing. A plurality of clutch bolts may be configured to permanently locate the clutch housing relative to the motor/generator stator in the radial direction and the axial direction, and also to fixedly attach the clutch housing to the motor/generator stator. The clutch housing is not permanently attached directly to the transmission housing.

A method of assembling a hybrid transmission, includes fully assembling a clutch module and placing the fully assembled clutch module into a transmission housing. The fully assembled clutch module is not secured to the transmission housing. The method then includes placing a motor/generator stator into the transmission housing and fixedly attaching the motor/generator stator to the transmission housing. The fully assembled clutch module is then fixedly attached to the motor/generator stator, such that the clutch module is indirectly grounded to the transmission housing.

The above features and advantages and other features and advantages of the present invention are readily apparent from the following detailed description of the best modes and other embodiments for carrying out the invention when taken in connection with the accompanying drawings.

BRIEF DESCRIPTION OF THE DRAWINGS

FIG. 4 is a schematic flow chart of an algorithm or method for assembling a hybrid transmission.

DESCRIPTION OF PREFERRED EMBODIMENTS

Figure 1:
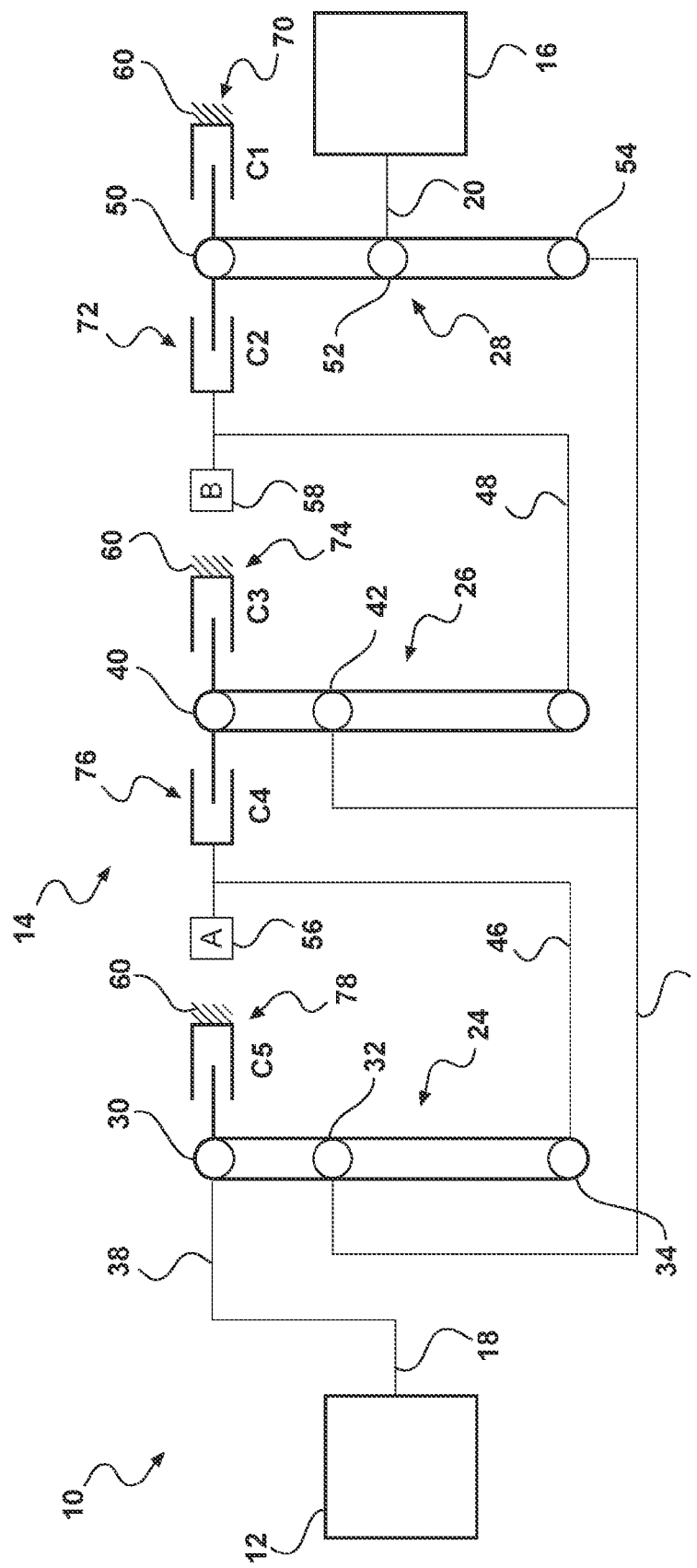
FIG. 1 is a schematic lever diagram illustration of an exemplary vehicle powertrain with a multi-mode, electrically-variable hybrid transmission in accordance with the present invention.

Referring to the drawings, wherein like reference numbers refer to like components throughout the several views, there is shown in FIG. 1 a stick or lever diagram depiction of an exemplary vehicle powertrain system, designated generally as 10. The powertrain 10 includes a restartable engine 12 that is selectively drivingly connected to, or in power flow communication with, a final drive system 16 via a multi-mode, electrically-variable hybrid-type power transmission 14.

Those having ordinary skill in the art will recognize that a lever diagram is a schematic representation of the components of a mechanical device such as a transmission. Each individual lever represents a planetary gearset, wherein the three basic mechanical components of the planetary gear are each represented by a node. Therefore, a single lever contains three nodes: one for the sun gear member, one for the planet gear carrier member, and one for the ring gear member. The relative length between the nodes of each lever may be used to represent the ring-to-sun ratio of each respective gearset. These lever ratios, in turn, are used to vary the gear ratios of the transmission in order to achieve appropriate ratios and ratio progression.

Mechanical couplings or interconnections between the nodes of the various planetary gear sets and other components of the transmission (such as motor/generators) are illustrated by thin, horizontal lines. Torque transmitting mechanisms such as clutches and brakes are presented as interleaved fingers. If the mechanism is a brake, one set of the fingers is grounded, or static.

The claimed invention is described herein in the context of a hybrid-type vehicular powertrain having a multi-mode, multi-speed, electrically-variable, hybrid transmission, which is intended solely as an illustrative application into which the present invention may be incorporated. The claimed invention is not limited to the particular powertrain arrangement shown in the drawings. Furthermore, the hybrid powertrain illustrated herein has been greatly simplified, as will be recognized by those having ordinary skill in the art.

The transmission 14 is designed to selectively receive at least a portion of its driving power from the engine 12, through an input member 18, for example. The transmission input member 18, which is in the nature of a shaft, may be the engine output shaft (also referred to as a "crankshaft"). Alternatively, a damper (not shown) may be implemented between the engine 12 and the input member 18 of the transmission 14.

The engine 12 transfers power to the transmission 14, which distributes torque through a transmission output member or shaft 20 to drive the final drive system 16, and thereby propel the vehicle (not shown).

In the powertrain 10 depicted in FIG. 1, the engine 12 may be any of numerous forms of internal combustion engines, which includes spark-ignited gasoline engines and compression-ignited diesel engines. The engine 12 is readily adaptable to provide its available power to the transmission 14 at a range of operating speeds.

Referring still to FIG. 1, the hybrid transmission 14 utilizes one or more differential gear arrangements, such as three interconnected epicyclic planetary gear sets, designated generally at 24, 26 and 28, respectively. The first, second, and third gear sets 24, 26, and 28, may alternatively be referred to as P1, P2, and P3, respectively. Each gear set includes three gear members: a first, second and third member.

The first, second and third gear sets may be counted "first" to "third" in any order in the drawings (e.g., left to right, right to left, etc.). Similarly, the first, second and third members of each gear set may be counted or identified as "first" to "third" in any order for each gear set in the drawings (e.g., top to bottom, bottom to top, etc.), in this description, and in the claims.

The first planetary gear set 24 has three gear members: a first, second and third member 30, 32 and 34; respectively. The first, second and third members may correspond to the first, second and third nodes of the lever diagram shown in FIG. 1, as viewed from top to bottom. The first member is an outer gear member (which may be referred to as a ring gear) that circumscribes the third member 34, which may include an inner gear member (which may be referred to as a sun gear).

The second member 32 is a planet carrier. A plurality of planetary gear members (which may be referred to as pinion gears or planets) are rotatably mounted on the second member, planet carrier 32. Through the planetary gear members, the planet carrier 32 is meshingly, or drivingly, engaged with both ring gear 30, and sun gear 34.

The second planetary gear set 26 also includes three gear members: a first, second and third member 40, 42 and 44, respectively. The first member is a ring gear 40 which circumscribes the third member, a sun gear 44. The ring gear 40 is coaxially aligned and rotatable with respect to the sun gear 44. A plurality of planetary gear members are rotatably mounted on the second member, a planet carrier 42, such that planet carrier 42 meshingly engages both the ring gear 40 and the sun gear 44.

The third planetary gear set 28, similar to the first and second gear sets 24, 26, also has first, second and third members 50, 52 and 54, respectively. In this arrangement, however, the second member 52, shown on the middle node of the lever representing the third planetary gear set 28, is the outer, ring gear. The ring gear 52 is coaxially aligned and rotatable with respect to the third member, sun gear 54. The first member is a planet carrier 50 in this particular gear set, and is shown on the top node. A plurality of planetary or pinion gear members are rotatably mounted on the planet carrier 50. Each of the pinion gear members is aligned to meshingly engage either the ring gear 52 and an adjacent pinion gear member or the sun gear 54 and an adjacent pinion gear member.

In the powertrain 10 shown in FIG. 1, the first and second planetary gear sets 24, 26 are simple planetary gear sets, whereas the third planetary gear set 28 is a compound planetary gear set. However, as will be recognized by those having ordinary skill in the art each of the planet carrier members described above can be either a single-pinion (simple) carrier assembly or a double-pinion (compound) carrier assembly. Embodiments with long pinions are also possible.

The first, second and third planetary gear sets 24, 26, 28 are compounded in that the second member 32 of the first planetary gear set 24 is connected to the second member 42 of the second planetary gear set 26 and the third member 54 of the third planetary gear set 28 by a central shaft 36. As such, these three gear members 32, 42, 54 are rigidly attached for common rotation.

The engine 12 is continuously connected to the first member 30 of the first planetary gear set 24 by, for example, an integral hub plate 38, for common rotation therewith. The third member 34 of the first planetary gear set 24 is continuously connected, for example, by a first sleeve shaft 46, to a first motor/generator assembly 56, which is also referred to herein as "motor A". The third member 44 of the second planetary gear set 26 is continuously connected, for example, by a second sleeve shaft 48, to a second motor/generator assembly 58, also referred to herein as "motor B". The second member 52 (the ring gear) of the third planetary gear set 28 is continuously connected to transmission output member 20 through, for example, an integral hub plate. The first and second sleeve shafts 46, 48 may circumscribe the central shaft 36.

A first torque transmitting mechanism 70—which is herein interchangeably referred to as clutch C1—selectively connects the first gear member 50 with a stationary member. The stationary member may be a transmission housing 60, or may have an indirect connection to the transmission housing 60 or some other grounded object within the powertrain 10. The second sleeve shaft 48, and thus third member 44 and motor/generator 58, is selectively connectable to the first member 50 of the third planetary gear set 28 through the selective engagement of a second torque transmitting mechanism 72—which is herein interchangeably referred to as clutch C2.

A third torque transmitting mechanism 74—which is herein interchangeably referred to as clutch C3—selectively connects the first gear member 40 of the second planetary gear set 26 to the transmission housing 60 or another stationary member. The first sleeve shaft 46, and thus third gear member 34 and first motor/generator 56, is also selectively connectable to the first member 40 of the second planetary gear set 26, through selective engagement of a fourth torque transmitting mechanism 76—which is herein interchangeably referred to as clutch C4.

A fifth torque transmitting mechanism 78—which is herein interchangeably referred to as clutch C5—selectively connects the input member 18 of engine 12 and the first gear member 30 of the first planetary gear set 24 to the transmission housing 60 or another stationary member. Clutch C5 is an input brake clutch, which selectively locks the input member 18 when engine 12 is off. Locking input member 18 provides more reaction for regenerative braking energy.

The first and second torque transmitting mechanisms 70, 72 (C1 and C2) may be referred to as "output clutches." The third and fourth torque transmitting mechanisms 74, 76 (C3 and C4) may be referred to as "holding clutches". The term "clutch" may be used to refer generally to any of the torque transmitting mechanisms, including, without limitation, devices commonly referred to as clutches, brakes, non-rotating or grounded clutches, et cetera.

In the exemplary embodiment depicted in FIG. 1, the various torque transmitting mechanisms 70, 72, 74, 76, 78 (C1-C5) are all friction clutches. However, other conventional clutch configurations may be employed, such as dog clutches, rocker clutches, and others recognizable to those having ordinary skill in the art. The clutches C1-C5 may be hydraulically actuated, receiving pressurized hydraulic fluid from a pump (not shown). Hydraulic actuation of clutches C1-C5 is accomplished, for example, by using a conventional hydraulic fluid control circuit, as will be recognized by one having ordinary skill in the art.

The planetary gear sets 24, 26, 28, as well as the first and second motor/generators 56, 58 (motors A and B) are coaxially oriented about the intermediate central shaft 36, which forms an axis of rotation 37 for the transmission 14. Motor A or motor B may take on an annular configuration, permitting one or both to generally circumscribe the three planetary gear sets 24, 26, 28 and the axis of rotation 37.

The hybrid transmission 14 receives torque from a plurality of torque-generative devices. "Torque-generative devices" include the engine 12 and the motors/generators 56, 58 as a result of energy conversion from fuel stored in a fuel tank or electrical potential stored in an electrical energy storage device (neither of which is shown).

The engine 12, motor A (56) and motor B (58) may operate individually or in concert—in conjunction with the planetary gear sets and selectively-engageable torque-transmitting mechanisms—to rotate the transmission output shaft 20. Moreover, motor A and motor B are preferably configured to selectively operate as both a motor and a generator. For example, motor A and motor B are capable of converting electrical energy to mechanical energy (e.g., during vehicle propulsion), and further capable of converting mechanical energy to electrical energy (e.g., during regenerative braking or during periods of excess power supply from engine 12).

Figure 2:
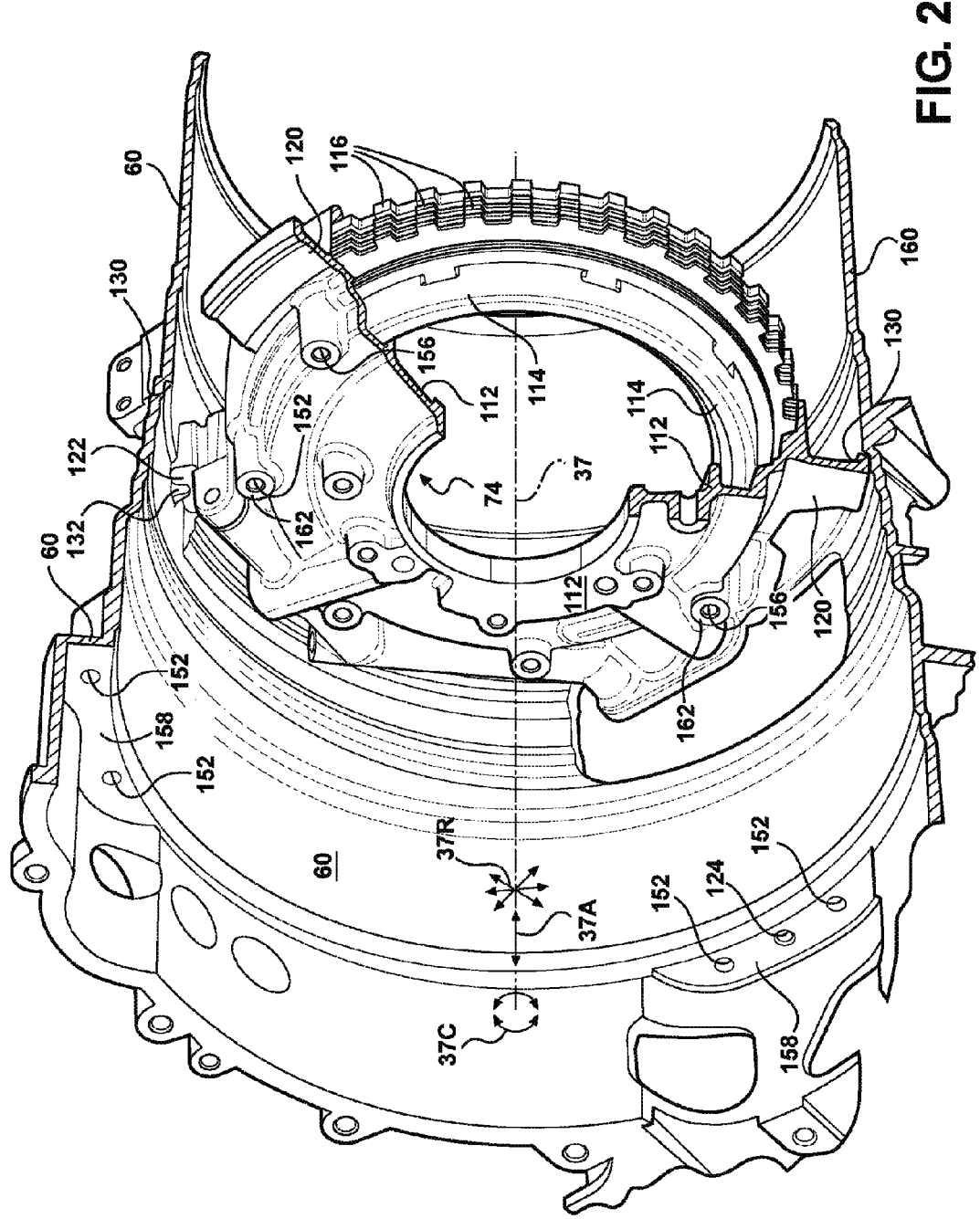
FIG. 2 is a schematic, partial exploded isometric view of a non-rotating clutch placed within the transmission.
Figure 3:
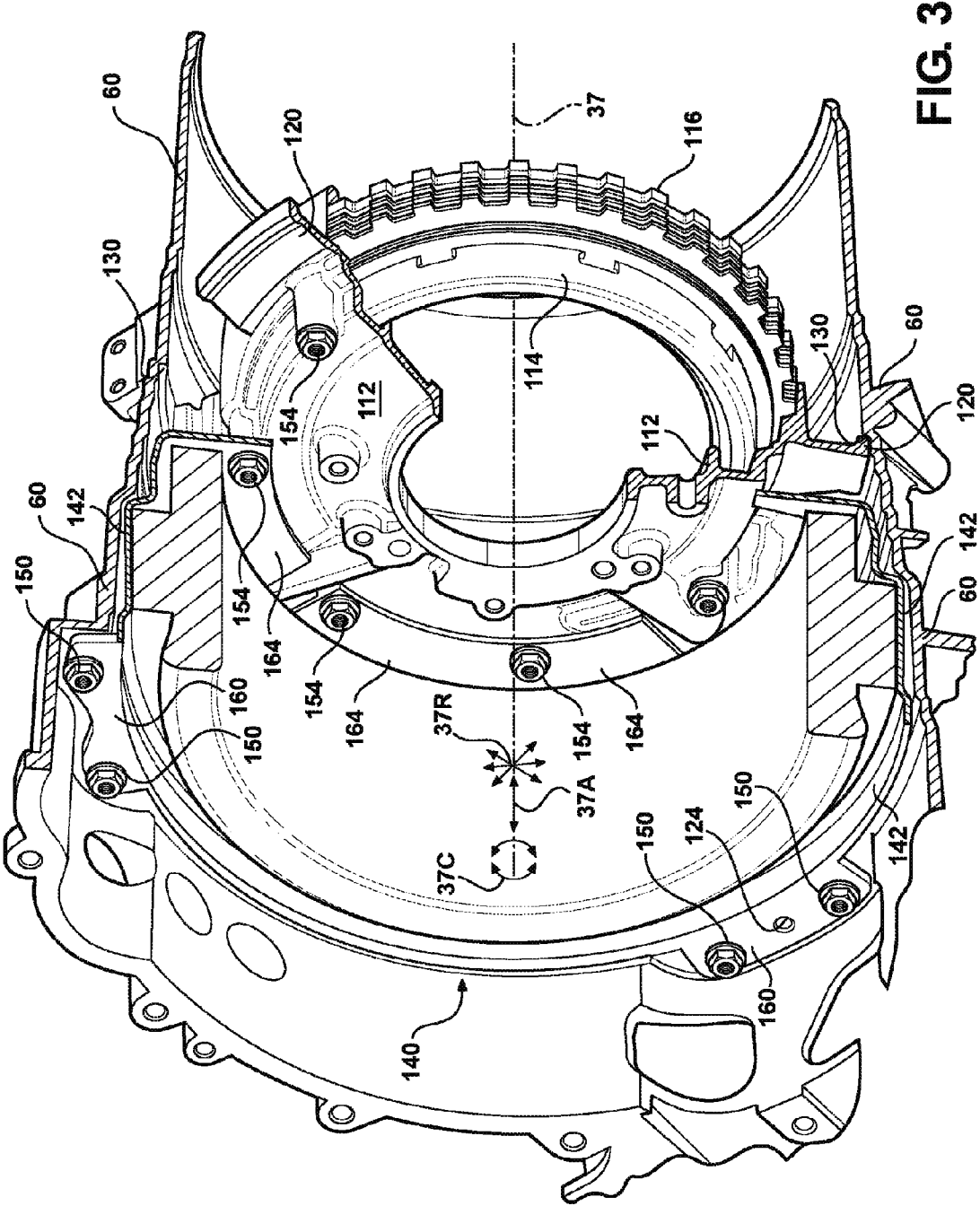
FIG. 3 is a schematic, partial exploded isometric view of a non-rotating clutch and motor/generator stator placed within and fixedly attached to the transmission.

Referring now to FIGS. 2 and 3, and with continued reference to FIG. 1, there are shown two partial views of the interior of transmission 14. FIG. 2 shows a partial isometric view of the third torque transmitting mechanism 74, C3, within the transmission 14. FIG. 3 shows another partial isometric view of the transmission 14, showing the assembled and attached clutch C3 (74) along with portions of motor A (56).

In the transmission 14 shown in FIGS. 1-3, C3 is the forward non-rotating clutch—a clutch with non-rotating reaction plates, also referred to as a brake, grounded clutch, or grounded torque transmitting mechanism. As discussed above, C3 selectively grounds the ring gear 40 of the second planetary gear set 26. Those having ordinary skill in the art will recognize that the C3 clutch may be used to ground other members or components by selectively connecting the members to the transmission housing 60.

The axis of rotation 37 of the transmission 14 may be used to generally define the coordinate system, directions of movement, or locations within the transmission 14. An axial direction 37A, which is generally parallel to the axis of rotation 37, defines the fore and aft location of components relative to the transmission housing 60. As viewed in FIGS. 2 and 3, the axial direction 37A is, roughly, left and right along the axis of rotation 37.

A radial direction 37R is generally perpendicular to the axis of rotation 37, and encompasses movement of location at angles of ninety degrees to the axis of rotation 37. Many of the rotating components of the transmission 14 will ideally be located along the radial direction 37R such that the individual component centerline (or component axis of rotation) is coincident with the axis of rotation 37.

A third direction or coordinate, a clocking rotation 37C, is used to establish the proper rotational orientation of components, especially components which are not completely radially symmetric. A component which is properly located in the axial direction 37A and the radial direction 37R may still need to be rotated about either the component's centerline or the axis of rotation 37 in a proper clocking position.

Many of the components of the transmission 14 will have a rotational axis that is parallel to, if not coincident with, the axis of rotation 37. Therefore, it may be assumed that there are only three degrees of freedom within the transmission housing 60, and the components assembled into the transmission 14 may need to be constrained in all three degrees: the axial direction 37A, the radial direction 37R, and the clocking rotation 37C. Axial orientation is provided when the component is fixed in the axial direction 37A. Radial orientation is provided when the component is fixed in the radial direction 37R. Rotational orientation is provided when the clocking rotation 37C of the component is fixed.

During assembly of the transmission 14, C3 is separately assembled into a fully-assembled C3 clutch module 74. This may occur at a separate facility or at the same facility as the assembly of transmission 14. In FIG. 2, the C3 clutch module 74 is shown after being placed into the transmission housing 60 (although the C3 clutch module 74 is only partially shown, for illustrative purposes).

The C3 clutch module 74 includes a clutch housing 112. Within the clutch housing 112 is a clutch piston 114, which is hydraulically actuated to engage the C3 clutch. Two sets of clutch plates 116 are pressed into frictional engagement by actuation of the clutch piston 114. The clutch plates 116 include both non-rotating plates, which are reacted by the non-rotation clutch housing 112, and rotating plates, which are reacted (directly or through a connecting member or sleeve) by the ring gear 40.

As shown in FIG. 2, the C3 clutch module 74 is not fixedly attached to any structure of the transmission 14 after initially being placed into the transmission housing 60. The C3 clutch module includes at least one first piloting feature, a clutch piloting boss 120, which is formed on the clutch housing 112. The clutch housing 112 shown in FIG. 2 has three clutch piloting bosses 120 (only two of which are viewable) which are radially spaced by approximately 120 degrees about the axis of rotation 37.

The transmission housing 60 includes a second piloting feature, a transmission piloting receptacle 130. In the transmission 14 shown in FIG. 2, the transmission piloting receptacle 130 is an annular ridge or ledge formed on the interior of the transmission housing 60.

The clutch piloting boss 120 and the transmission piloting receptacle 130 cooperate to orient the clutch housing 112 relative to the transmission housing 60 in the axial direction 37A and also the radial direction 37R. The clutch C3 (74) is lowered or placed into the transmission housing 60 until the clutch piloting boss 120 contacts the transmission piloting receptacle 130.

At this point in the assembly process, the axial orientation of the clutch housing 112 is only a rough or general orientation. However, the radial orientation provided by the clutch piloting boss 120 and transmission piloting receptacle 130 is more tightly controlled. Therefore, the clutch housing is near its final location in the radial direction 37R, but is not placed in its final, fixed axial by the clutch piloting boss 120 and transmission piloting receptacle 130.

A third piloting feature, a transmission key feature 132, is formed on the interior of the transmission housing 60. The transmission key feature 132 may be formed during the die casting process which forms the transmission housing 60. The transmission key feature 132 may be used as the origin of the clocking rotation 37C, such that the transmission key feature 132 may be referred to as the twelve-o-clock position. The clutch housing 112 includes a fourth piloting feature, a key slot 122. In the configuration shown, the key slot 122 is a U-shaped or V-shaped notch formed in a peripheral boss of the clutch housing 112, and is configured to be generally mated or aligned to the transmission key feature 132.

The transmission key feature 132 and the key slot 122 cooperate to orient the clutch housing 112 relative to the transmission housing 60 in the clocking rotation 37C, such that the twelve-o-clock position of the clutch housing 112 matches the twelve-o-clock position of the transmission housing 60. Similar to the radial orientation in the radial direction 37R, the orientation and the clutch housing 112 in the clocking direction 37C is near its final location within the transmission housing 60.

FIG. 2 shows the transmission 14 after the C3 clutch module 74 has been placed into the transmission housing 60 and the clutch housing 112 has been piloted to the clutch piloting boss 120 and transmission piloting receptacle 130 and the clutch housing 112 by transmission key feature 132 and key slot 122. At this point, the clutch housing 112 is only roughly oriented in the axial direction 37A, but the radial direction 37R and clocking rotation 37C are closely aligned to their final positions. Alternatively stated, the clutch housing 112 remains loose in the axial direction 37A.

The piloting features shown are not the only forms or types of piloting structures which may be used within the scope of the appended claims. Furthermore, those having ordinary skill in the art will recognize that the male or female nature of the specific piloting features shown are not limiting. For example, and without limitation, the clutch housing 112 could have a generally male fourth piloting feature to radially align the C3 clutch module 74 with a generally female third piloting feature on the transmission housing 60.

As shown in FIG. 3, after the C3 clutch module 74 is placed into the transmission housing 60, and generally oriented by the clutch piloting features (120, 130 and 122, 132), a motor/generator stator module 140 may be placed into the transmission 14. The stator module 140 is the stationary member (stator) for motor A (56) and housed within a stator can 142.

The stator module 140 is configured to be fixedly attached to the transmission housing 60. A plurality of stator bolts 150 (shown in FIG. 3) cooperate with a plurality of stator bolt holes 152 (shown in FIG. 2) in the transmission housing 60 to secure the stator can 142 to the transmission housing 60.

The transmission housing 60 and stator can 142 may also include stator piloting features. One or more dowel holes 124 are formed in the transmission housing 60 (as shown in FIG. 2) and in the stator can 142 (as shown in FIG. 3). Dowel pins (not shown in FIG. 2 and blocked from view in FIG. 3) cooperate with the dowel holes 124 to pilot the stator can 142 to the transmission housing 60. The dowel pins and dowel holes 124 align the stator can 142 in the radial direction 37R and clocking rotation 37C.

The transmission housing 60 includes one or more flats 158 adjacent the stator bolt holes 152, and the stator can 142 includes one or more tabs or flats 160. As the stator bolts 150 are placed into the stator bolt holes 152 and tightened, the flats 158 and 160 are brought together and cooperate with the stator bolts 150 to fixedly locate the stator can 142 in the axial direction 37A.

The stator bolts 150 are, therefore, configured to permanently locate the stator module 140 relative to the transmission housing 60 in the axial direction 37A. The stator bolts 150 also fix the radial and clocking locations of the stator can 142 (which were already established by the dowel pins and dowel holes 142) such that no further orientation or alignment of the stator module 140 is needed. As used herein, "permanently located," "permanently fixed," "fixedly attached," and the like refer to the final assembly states of the reference components. Those having ordinary skill in the art will recognize that small shifts or movements of parts or attachment hardware may occur over the lifetime of parts.

The C3 clutch module 74 is configured to be fixedly attached to the stator module 140 via a plurality of clutch bolts 150. The stator can 142 and clutch housing 112 further include a plurality of clutch bolt holes 156. (Note that the portion of the clutch bolt holes 156 formed through the stator can 142 are hidden from view by the clutch bolts 154, but some of the clutch bolt holes 156 formed in the clutch housing 112 are viewable in FIG. 2). The clutch bolts 154 are configured to permanently fix the location of the clutch housing 112, and therefore the C3 clutch module 74, relative to the stator module 140 in the axial direction 37A. The clutch bolts 154 also fix the final radial direction 37R and clocking rotation 37C positions.

The clutch housing 112 includes one or more flats 162 adjacent the clutch bolt holes 156, and the stator can 142 includes one or more tabs or flats 164. As the clutch bolts 154 are placed into the clutch bolt holes 156 and tightened, clutch housing 112 is pulled (leftward, as viewed in FIGS. 2 and 3) and the flats 162 and 164 are brought together and cooperate with the clutch bolts 154 to fixedly locate the clutch housing 112 in the axial direction 37A.

The clutch bolts 154 are, therefore, configured to permanently locate the clutch housing 112 relative to the transmission housing 60 in the axial direction 37A. The clutch bolts 154 also fix the radial and clocking locations of the clutch housing 112, which were already closely established by the clutch piloting features (120, 130 and 122, 132), such that no further orientation or alignment of the clutch housing 112 is needed.

Therefore, during assembly of the transmission 14, the clutch piloting boss 120 and transmission piloting receptacle 130 axially and radially orient the C3 clutch module 74 and the transmission key feature 132 and key slot 122 rotationally orient the C3 clutch module 74. Furthermore, the clutch piloting features (120, 130 and 122, 132) are also configured to sufficiently align the clutch bolt holes 156 to allow subsequent engagement of the clutch bolts 154. Note that none of the clutch piloting features (120, 130 and 122, 132) attaches or precisely axially aligns the C3 clutch module 74 within the transmission 14. The C3 clutch module 74 is not fixed in the axial direction 37A until after the clutch bolts 154 are inserted and tightened and the flats 162 and 164 are pressed together.

Note that after securing the clutch housing 112 with the clutch bolts 154, the C3 clutch module 74 is grounded to the transmission housing 60, but is grounded indirectly through the stator can 142. Therefore, the C3 clutch module 74 is not directly attached to the transmission housing 60.

Referring now to FIG. 4, and with continued reference to FIGS. 1-3, there is shown a method 200 of assembling a portion of the transmission 14. The method 200 shown includes only a portion of the assembly of the transmission 14, and there may be additional steps prior to, or after, those shown in FIG. 4. Different portions of the method 200 (as well as other processes within the assembly of transmission 14) may occur at different assembly or manufacturing facilities.

For illustrative purposes, the method 200 may be described with reference to the elements and components shown and described in relation to FIGS. 1-3. However, those having ordinary skill in the art will recognize other elements which may be used to practice the method 200 and the invention as defined in the appended claims. Those having ordinary skill will further recognize that the exact order of the steps of the method 200 shown in FIG. 4 is not required, and that steps may be reordered, steps may be omitted, and additional steps may be included.

The method 200 begins at step 210 with substantially full assembly of the C3 clutch module 74. The C3 clutch module 74 is placed into the transmission housing 60 in step 212, but the C3 clutch module 74 is not secured or fixedly attached to the transmission housing 60. At step 214 the piloting features (120, 122, 130, 132) are utilized to align and orient the C3 clutch module 74 relative to the transmission housing 60. Alignment and placing of the C3 clutch module 74 into the transmission housing 60 in steps 212 and 214 may occur substantially simultaneously.

The stator module 140 is assembled in step 216 and is placed into the transmission housing 60 in step 218, which may include aligning and orienting the stator module 140 with any stator piloting features. The stator module 140 is fixedly attached to the transmission housing 60 in step 220.

After the stator module 140 is attached to the transmission housing 60, the C3 clutch module 74 is then fixedly attached to the stator can 142 of the stator module 140 in step 222. The C3 clutch module 74 is rotationally, radially, and axially aligned with the transmission housing 60 at step 214. However, the C3 clutch module 74 is not attached to the transmission housing 60 until attached (likely via clutch bolts 154) to the stator module 140 in step 222.

The present invention is described in detail with respect to automotive applications; however, those skilled in the art will recognize the broader applicability of the invention. Those having ordinary skill in the art will further recognize that terms such as "above," "below," "upward," "downward," et cetera, are used descriptively of the figures, and do not represent limitations on the scope of the invention, as defined by the appended claims. While the best modes and other embodiments for carrying out the claimed invention have been described in detail, those familiar with the art to which this invention relates will recognize various alternative designs and embodiments for practicing the invention within the scope of the appended claims.

The invention claimed is:

1. A hybrid transmission, comprising:
a transmission housing;
a first piloting feature formed on said clutch housing;
a motor/generator stator configured to be attached to said transmission housing; and
a clutch housing configured to be attached to said motor/generator stator, such that said clutch housing is static relative to said transmission housing.

2. The transmission of claim 1, wherein the transmission includes an axis of rotation defining a coordinate system having an axial direction, a radial direction, and a clocking rotation, and further comprising:
a second piloting feature formed on said transmission housing, and
wherein said second piloting feature and said first piloting feature cooperate to orient said clutch housing relative to said transmission housing in the axial direction and the radial direction, and wherein said second piloting feature and said first piloting feature are configured not to permanently locate said clutch housing in the axial direction and not to permanently attach said clutch housing to said transmission housing.

3. The transmission of claim 2, further comprising:
a third piloting feature formed on said transmission housing; and
a fourth piloting feature formed on said clutch housing, wherein said third piloting feature and said fourth piloting feature cooperate to orient the clocking rotation of said clutch housing relative to said transmission housing.

4. The transmission of claim 2, further comprising:
a plurality of stator bolts configured to permanently locate the axial direction, the radial direction and clocking rotation of said motor/generator stator relative to said transmission housing, and to permanently attach said motor/generator stator to said transmission housing; and
a plurality of clutch bolts configured to permanently locate said clutch housing relative to said motor/generator stator in the radial direction and the axial direction, and to fixedly attach said clutch housing to said motor/generator stator.

5. The transmission of claim 4, wherein said clutch housing is not permanently attached directly to said transmission housing.

6. A hybrid transmission having an axis of rotation defining a coordinate system having an axial direction, a radial direction, and a clocking rotation, the transmission comprising:
a transmission housing;
a motor/generator stator fixedly and directly attached to said transmission housing;
a clutch housing fixedly and directly attached to said motor/generator stator, such that said clutch housing is not directly attached to said transmission housing, wherein said clutch housing houses a plurality of clutch plates;
a plurality of stator bolts configured to permanently locate the axial direction, the radial direction and clocking rotation of said motor/generator stator relative to said transmission housing, and to permanently attach said motor/generator stator to said transmission housing; and
a plurality of clutch bolts configured to permanently locate said clutch housing relative to said motor/generator stator in the radial direction and the axial direction, and to fixedly attach said clutch housing to said motor/generator stator.

7. The transmission of claim 6, further comprising:
a first piloting feature formed on said clutch housing; and
a second piloting feature formed on said transmission housing, wherein said second piloting feature and said first piloting feature cooperate to orient said clutch housing relative to said transmission housing in the axial direction and the radial direction, and wherein said second piloting feature and said first piloting feature are configured not to permanently locate said clutch housing in the axial direction and not to permanently attach said clutch housing to said transmission housing.

8. The transmission of claim 7, further comprising:
a third piloting feature formed on said transmission housing; and
a fourth piloting feature formed on said clutch housing, wherein said third piloting feature and said fourth piloting feature cooperate to orient the clocking rotation of said clutch housing relative to said transmission housing.

9. A method of assembling a hybrid transmission, comprising:
fully assembling a clutch module;
placing the fully assembled clutch module into a transmission housing, wherein the fully assembled clutch module is not secured to the transmission housing;
placing a motor/generator stator into the transmission housing;

fixedly attaching the motor/generator stator to the transmission housing after placing the fully assembled clutch module into the transmission housing; and fixedly attaching the fully assembled clutch module to the motor/generator stator after fixedly attaching the motor/generator stator to the transmission housing.

10. The method of claim 9, wherein placing the fully assembled clutch module into the transmission housing includes aligning a fourth piloting feature on the fully assembled clutch module with a third piloting feature on the transmission housing to rotationally orient the clutch.

11. The method of claim 10, wherein placing the fully assembled clutch module into the transmission housing includes aligning a first piloting feature on the fully assembled clutch module with a second piloting feature on the transmission housing to axially and radially orient the fully assembled clutch module.

12. The method of claim 11, wherein fixedly attaching the motor/generator stator to the transmission housing includes bolting the motor/generator stator to the transmission housing, and the final axial position of the motor/generator stator relative to the transmission housing is set by the bolting, and wherein fixedly attaching the fully assembled clutch module to the motor/generator stator includes bolting the fully assembled clutch module to the motor/generator stator, and the final axial position of the fully assembled clutch module relative to the transmission housing is set by the bolting.

* * * * *